United States Patent

Billawala

[15] 3,678,482

[45] July 18, 1972

[54] MULTIPLE SURFACE FLUID FILM BEARING

[72] Inventor: Shahbuddin A. Billawala, Thousand Oaks, Calif.

[73] Assignee: Burroughs Corporation, Detroit, Mich.

[22] Filed: Aug. 26, 1970

[21] Appl. No.: 67,012

[52] U.S. Cl...................................340/174.1 E, 179/100.2 P

[51] Int. Cl........................................G11b 5/60, G11b 21/20

[58] Field of Search.............................340/174.1 E, 174.1 F; 179/100.2 P; 308/DIG. 1

[56] References Cited

UNITED STATES PATENTS

| | | | |
|---|---|---|---|
| 3,229,268 | 1/1966 | Solgst | 340/174.1 E |
| 3,435,442 | 3/1969 | Ma et al. | 340/174.1 E |
| 3,579,214 | 5/1971 | Solyst | 340/174.1 F |
| 3,228,014 | 1/1966 | Scott | 340/174.1 E |
| 3,573,768 | 4/1971 | Harris | 179/100.2 P |
| 3,582,917 | 6/1971 | Hertrich | 179/100.2 P |
| 3,516,081 | 6/1970 | Horsfall et al. | 340/174.1 E |
| 3,525,987 | 8/1970 | Muisderman et al. | 340/174.1 E |

*Primary Examiner*—Vincent P. Canney
*Attorney*—Christie, Parker & Hale

[57] ABSTRACT

A magnetic memory system having a recording head adjacent a movable disk is described wherein the recording head is separated from the disk by a fluid bearing. In a preferred embodiment, the bearing comprises a taper land bearing having a main bearing face preceded by a converging bearing face. A narrow slot provides a hydrodynamic separation between the trailing edge of the main face and the leading edge of a satellite face coplanar with the main bearing face. A diverging face is provided aft of the satellite face. In operation the recording head is retracted until the disk is up to its usual rotational speed, and then the head is advanced toward the disk to its final floating position in the order of 30 microinches from the surface. The satellite face and diverging face cooperate during the transitional "landing" of the recording head to produce a fluid film force that pivots the recording head to its final floating position without contact between the disk and head.

17 Claims, 15 Drawing Figures

INVENTOR
SHAHBUDDIN A. BILLAWALA

BY

Christie, Parker & Hale
ATTORNEYS

FIG. A
PRIOR ART

FIG. B
PRIOR ART

MULTIPLE SURFACE FLUID FILM BEARING

BACKGROUND

A significant item of peripheral equipment for modern day computers is a magnetic memory wherein data is stored on a rapidly rotating disk having a magnetic recording medium on the faces of the disk. Data is written onto the magnetic recording medium and read therefrom by magnetic transducers mounted in recording heads in close proximity to the rotating disk. Since the disk is moving at very high speed, contact between the recording head and the disk is totally unacceptable because of the wear that would occur. The recording heads are, therefore, provided with specially prepared surfaces that cooperate with the surface of the disk for generating a fluid film bearing between the two relatively movable surfaces. An entrained film of air on the rapidly moving disk provides fluid forces on the bearing surfaces of the recording head which hold the two relatively movable elements apart. The term "recording head" is used even though the heads are typically capable of both reading and writing magnetic signals.

There has been a continual trend in disk memories to record data at higher bit densities, that is, where individual data bits are spaced apart by shorter and shorter distances. As the bit densities employed become higher, it becomes more desirable to reduce the spacing between the recording head and the moving disk. Signal strength is also enhanced at close head to disk spacing. The problems of preparing suitable fluid film bearings becomes aggravated as the spacings become smaller and smaller. Previously, it has been considered that the closest reasonable approach of the recording head to the disk is in the order of 60 to 100 microinches; however, it is desired to substantially reduce this distance.

In high speed disk memories, the recording head is retracted when the disk is stationary or turning at low speed. When operation is started, the disk is brought up to full operating speed, and the recording heads are then pressed towards the disk to their final floating position adjacent the disk. The heads may also be retracted, if desired, when the disk is running and there is no need to read or write data. It is common in this art to speak of the recording head "flying" adjacent the memory surface. The technique for bringing the recording head from its retracted position to its final floating position is commonly referred to as "landing" the head, even though there is no physical contact between the head and the surface of the disk. In fact, the prevention of contact between the head and disk surface is of great importance since the "-crash" of a head, even momentarily, on a disk surface can result in damage not only to the head but also to the expensive rotating disk.

A recording head mounting apparatus is described in U.S. Pat. No. 3,310,792 to R. G. Groom, et al. Briefly, in this patent a resilient gimbal spring mounting is provided for a magnetic recording head adapted to float on an air film adjacent the surface of a rapidly moving disk memory or the like, The gimbal spring retracts the recording head from the surface of the disk to a retracted position wherein the spring is in its neutral or unstressed position. In addition to retracting the recording head from the disk, the gimbal spring permits alignment of the head and exerts a very small moment on the recording head so that when in the retracted position the toe or leading edge of the recording head is further from the disk surface than is the heel or trailing edge. A pneumatically operated piston presses the recording head from its retracted position towards its final floating position adjacent the disk, thereby stressing the gimbal spring. When the recording head is in its final floating position, the fluid film forces between the head and the disk serve to position the head in rotation about the piston so that the heel and toe are more nearly equidistant from the disk surface than in the retracted position.

In landing the recording head in its final floating position, there is a danger of the heel of the head contacting the surface of the disk since the toe is pitched up and the fluid forces effective in the final floating position are not yet generated. In the past a compromise has been needed between the desired very small operating spacing between the head and the disk, and the landing characteristics of the head. If the spacing is too small, the head cannot be successfully landed without crashing into the disk. If the spacing is larger, the recording characteristics are degraded.

The landing characteristics can be improved in a head with close spacing from a disk by reducing the forces exerted by the gimbal spring. This, however, introduces a different problem. When a light or soft gimbal spring is used, the head is subject to transient vibrations and position variations that adversely affect alignment characteristics of the bearing.

It is, therefore, desirable to provide a means for enhancing landing characteristics of a fluid film bearing of a recording head adjacent a moving recording surface without increasing the operating spacing between a recording head and memory surface or softening the mounting.

BRIEF SUMMARY OF THE INVENTION

Thus, in practice of this invention according to a presently preferred embodiment, there is provided a fluid film bearing member movable between a retracted position and a final floating position having a main bearing portion arranged to float adjacent a second member movable relative thereto, and means for generating a larger fluid film force than the main bearing portion at an intermediate position during transition of the bearing member between the retracted position and a final floating position comprising a satellite bearing portion at least partly hydrodynamically separated from the trailing edge of the main bearing portion.

DRAWINGS

These and other features and advantages of the invention will be appreciated as the same becomes better understood by reference to the following detailed description of a presently preferred embodiment when considered in connection with the accompanying drawings wherein:

FIG. A illustrates a prior art recording head in its final floating position;

FIG. B illustrates the prior art head of FIG. A during landing;

Throughout the drawings like numerals refer to like parts.

DESCRIPTION

Figure 2:
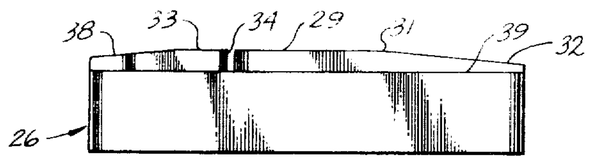
FIG. 2 is a side view of the head of FIG. 1.

FIG. A illustrates a typical prior art recording head 16 "flying" adjacent a recording disk 17 in its final floating position. As illustrated in this drawing and others hereinafter, the disk 17 moves from right to left. In its final floating position, the recording head 16 floats at a minimum distance H from the surface of the disk, and since the head normally flies with its toe 18 pitched up by a small angle $\theta$ relative to its heel 19, the minimum distance H is at the trailing edge or heel 19 of the recording head. The recording head 16 is provided with a flat face 21 that floats adjacent the disk pitched up at the small angle $\theta$ in the final floating position. Forwardly on the recording head from the face 21 is a second flat converging face 22, the trailing edge of which is coincident with the leading edge of the face 21. The converging face 22 is angulated relative to the main face 21 of the fluid film bearing on the recording head by a small angle $\alpha$.

It should be recognized that the angles $\alpha$ and $\theta$ and distance H, and similar angles and distances hereinafter set forth, are greatly exaggerated as compared with actual practice in order to aid in illustration. Thus, for example, in a prior art fluid film bearing, as illustrated in FIG. A, the distance H may be in the order of 100 microinches, and the angles $\alpha$ and $\theta$ are in the order of only a few minutes of arc.

As mentioned hereinabove, a gimbal spring (not shown) is connected to the recording head and permits alignment of the head. Moment M, which can be considered to act about the point where a piston 23 acts on the side of the head 16 opposite from the fluid film bearing faces 21 and 22, is required to overcome the very slight gimbal spring moment and make the head fly parallel to the disk surface. The piston 23 applies a force P to the recording head, pressing it towards the rapidly moving disk. Moment M is generated by forces $F_1$ and $F_2$ applied by the fluid film between the disk and recording head. The force $F_1$ in effect acts through the center of pressure on the main face 21 of the fluid film bearing, and the force $F_2$ in effect acts through the center of pressure on the converging face 22 of the fluid film bearing. As the distance between the head and disk in the final floating position is decreased, the required location of the piston 23 becomes nearer the heel 19 of the recording head in order to maintain the desired angle $\theta$ for stable floating.

As mentioned hereinabove, the head is retracted at any time the disk is at lower than its usual operating speed and when the disk is at operating speed it is necessary to "land" the head adjacent the disk for data reading or recording operations. In order to land the head, pneumatic pressure is applied to the piston 23 which forces the recording head 16 towards the disk 17, as illustrated in FIG. B. The gimbal spring (not shown) tilts the toe 18 of the head upwardly in the retracted position, and as the head is pressed towards the disk, the heel 19 first approaches the disk and a force $F_1$ due to a fluid film between the head and disk commences to act on the main face 21 thereby pivoting the heel 19 of the head away from the disk as the head approaches the disk. This pivoting is caused by a moment produced by the force couple $F_1$ and P since there is substantially no force generated by the converging face 22, which is still sufficiently remote from the surface of the disk that a stable fluid film generating a substantial pressure has not formed.

When it is desired to have the recording head a very small distance from the disk in its final floating position, the force distribution is such that the piston 23 must be located nearer the heel 19 of the recording head than when a thicker fluid film is present. As the piston is positioned nearer the heel of the recording head, the landing moment produced by the force $F_1$ is diminished due to the diminished moment arm, and difficulties are encountered in landing the recording head since the heel 19 may strike the surface of the disk before a sufficient force $F_1$ is generated to pivot the recording head to its final floating position.

Figure 1:
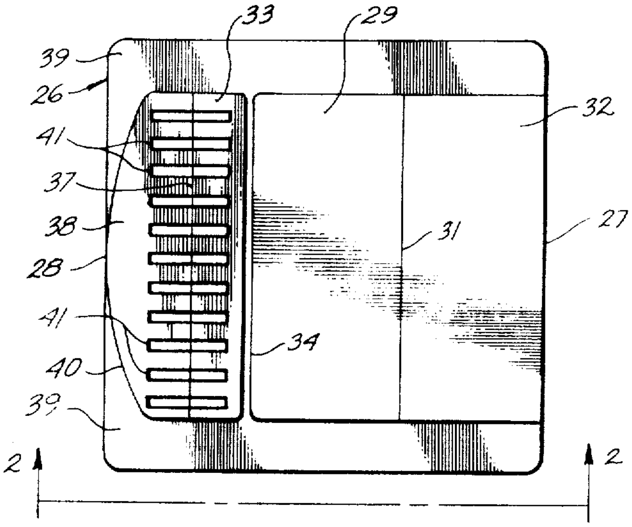
FIG. 1 illustrates the bearing face of a magnetic recording head incorporating principles of this invention.

FIGS. 1 and 2 illustrate a magnetic recording head incorporating principles of this invention. As illustrated in this presently preferred embodiment, there is provided a recording head 26 having a leading end or toe 27 and a trailing end or heel 28. The toe and heel refer to the preceding and following edges respectively as the recording head is used adjacent a magnetic memory disk, for example. In such an arrangement, the disk moves adjacent the head in a direction from the toe towards the heel.

Figures 3, 4, 13:
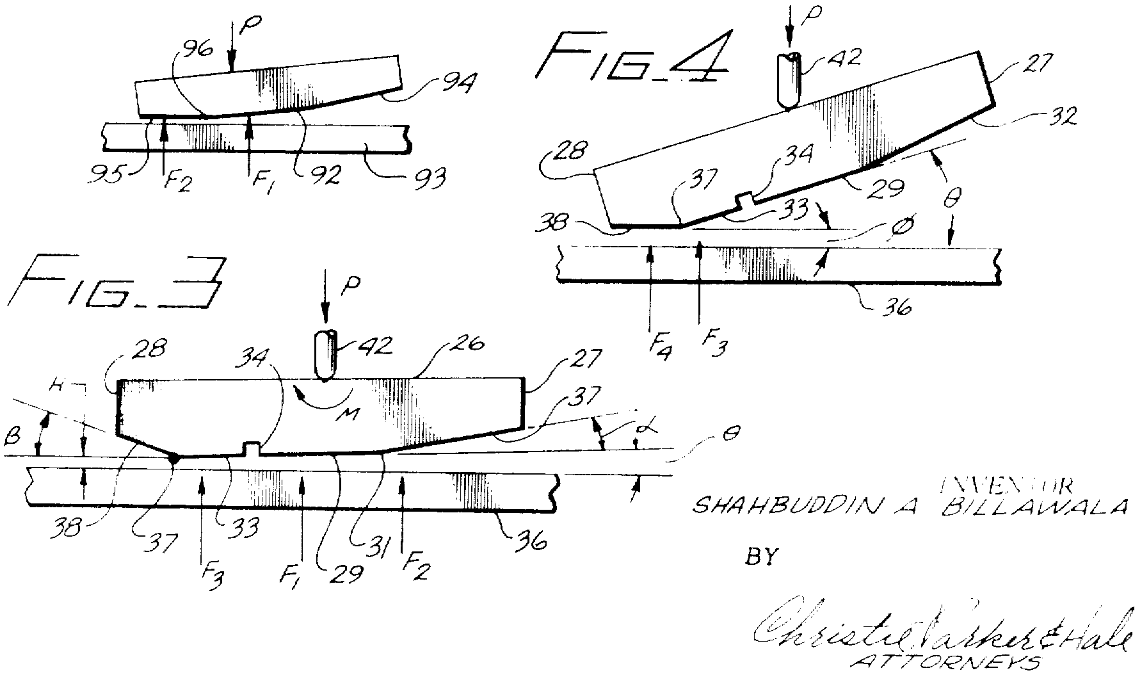
FIG. 3 illustrates schematically the head of FIG. 1 in its final floating position.
FIG. 4 illustrates the head of FIG. 1 during landing.
FIG. 13 illustrates another embodiment of fluid film bearing.

The recording head has a main bearing face 29 along the leading edge 31 of which is a converging face 32. In the illustrated embodiment, the main face 29 and converging face 32 are planes and the converging face 32 is angulated relative to the main face 29 by a small angle $\alpha$ (FIG. 3), which is typically only a few minutes of arc. The fluid film bearing portion of the recording head 26 also has a satellite bearing face 33 aft of the trailing edge of the main face 29. The satellite face 33 is coplanar with the main face 29 and separated therefrom by a narrow slot 34 running from one side of the bearing to the other side in a direction transverse to the direction of motion of the bearing surface relative to the adjacent recording surface on a recording disk 36 (FIG. 3). The slot 34 provides a hydrodynamic separation between the main face 29 and the satellite face 33 so that separate pressure distributions are established on these two faces during operation of the fluid film bearing. In determining the pressure distributions, hydrodynamic equations are employed since viscous flow is involved in the very thin fluid films (typically less than 100 microinches) and inertial forces of the fluid are not significant.

At the trailing edge 37 of the satellite bearing face 33 is a diverging face 38, the leading edge of which is coincident with the trailing edge 37 of the satellite face. The diverging face 38 is angulated relative to the satellite bearing face by a small angle $\beta$ (FIG. 3). The angle $\beta$ is only a few minutes of arc and is preferably larger than the angle $\alpha$ between the main face and the converging face. The trailing edge 40 of the diverging face 38 is curved (FIG. 1) for minimizing the probability of a corner of the head coming in contact with the surface of a moving disk. In the illustrated embodiment, a step is provided from the several faces 32, 29, 33, and 38 of the bearing surface to a shoulder 39 that during operation is sufficiently far from a memory disk surface that the fluid film has no influence thereon.

A plurality of magnetic transducers 41 are mounted in the recording head with their pole pieces arranged in a conventional manner so that the magnetic gap of each transducer is adjacent the bearing surface. In this embodiment, the magnetic gap (not shown) is arranged approximately on the apex 37 between the satellite face 33 and the diverging face 38 since when the recording head is employed in its final floating position, this apex is the portion of the head closest to the magnetic recording medium.

FIG. 3 illustrates schematically the recording head of FIGS. 1 and 2 in its final floating position adjacent a rotating disk 36 having a magnetic memory medium (not shown) on the surface. As illustrated in this embodiment, the disk is rotating from right to left. In its final floating position, the head 26 flies or floats with its toe 27 pitched up at an angle $\theta$ which is in the order of only a few minutes of arc. A pneumatically operated piston or plunger 42 applies a force P urging the recording head toward the disk and a conventional gimbal spring (not shown) counteracts moment M around the point where the piston contacts the back side of the recording head. Forces $F_1$ and $F_2$ representing the center of pressure of the fluid film on the faces 29 and 32, respectively, act in much the same manner as the corresponding forces $F_1$ and $F_2$ in the prior art taper land bearing. In addition to these forces, a force $F_3$ representing the center of pressure of the fluid film on the satellite face 33 also is opposed to the piston force P. When the recording head is in its final floating position, fluid film forces on the diverging face 38 are negligible. In this final floating position, the force $F_3$ on the satellite face 33 is quite small as compared with the forces $F_1$ and $F_2$ on the main face 29 and converging face 32. This is partly for the reason that the satellite face is smaller, but principally because the converging face and main face cooperate as a taper land bearing, which inherently has larger forces at a given angle of attack than a plane bearing, and the satellite face has the pressure distribution of a plane bearing having an angle of attack of $\theta$. Thus, when the recording head is in its final floating position, the principal portion of force is generated by the main bearing face 29 in cooperation with the converging bearing face 32. Only a minor portion of the force is generated by the satellite bearing face 33.

FIG. 4 illustrates schematically the recording head of FIGS. 1 and 2 in a transitional stage between the retracted position and the final floating position during the step known as landing. At this time, the piston 42 applies a force P forcing the recording head 26 toward the disk 36. As the head is landed, its toe 27 is pitched up at an angle $\theta$ substantially larger than the angle $\theta$ in the final floating position (even in landing the angle $\theta$ is in the order of minutes of arc). The pitch up of the toe of the head is such that the diverging face 38 has its leading edge 37 pitched up from the disk at a small angle $\phi$. In this flight attitude, the satellite face 33 and diverging face 38 cooperate as a taper land bearing generating a relatively larger force $F_4$ by action of the fluid film on the diverging face and a relatively smaller force $F_3$ due to action of the fluid film on the satellite face. The two forces $F_3$ and $F_4$ are a substantial distance from the point of application of pressure by the piston P, and because of this long moment arm a substantial moment is exerted on the recording head tending to bring the heel up and the toe down toward the final floating position.

As the head pivots toward its final floating position, the force $F_3$ on the satellite face increases and becomes more influential in applying a moment to the recording head. Eventually the head pivots through a position where the angle $\phi$ between the diverging face and the disk is 0, and the force $F_4$ on that face becomes of decreasing influence. In the initial stages of landing the recording head adjacent the disk, the forces $F_1$ and $F_2$ on the main bearing face and converging bearing face are negligible, and as the final floating position is approached these forces increase gradually with the force $F_1$ on the main bearing face being generated first in a manner somewhat similar to a plane bearing so that the force is at that stage applied further aft than in the final floating position, also tending to pivot the head toward its final floating position. Thus, during the initial stages of landing the force generated by the satellite face and diverging face is substantially larger than the force generated by the main bearing face, thereby assuring that the head does not crash against the disk during landing.

The hydrodynamic separation between the satellite face 33 and the main face 29 of the fluid film bearing permits the satellite face to perform substantially as a separate bearing while in its final floating position. This generates a fluid film force separate from the fluid film force on the main bearing face and permits the piston 42 to be located further forward on the head than if the satellite face were continuous with the main face, even though the piston must be relatively nearer the trailing edge of the main bearing face at the very close spacing H than it would be at a larger spacing. Thus, for example, in a taper land bearing if the minimum spacing between the bearing surface and the disk is decreased from about 60 to about 30 microinches, the point of application of the force P must move toward the rear end of the bearing about 10 percent, which, although not large in absolute terms, is of very significant proportion in respect to the landing characteristics of the bearing. The satellite bearing face 33 and diverging bearing face 38 alleviate landing problems due to the shift of piston position.

Figure 5:
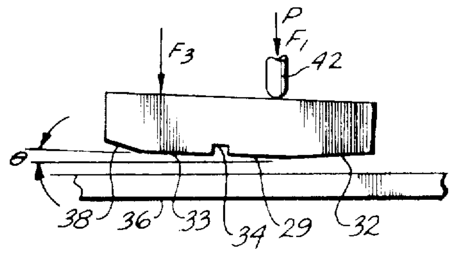
FIG. 5 illustrates schematically the recording head of FIG. 1 in an abnormal floating position.
Figure 5:
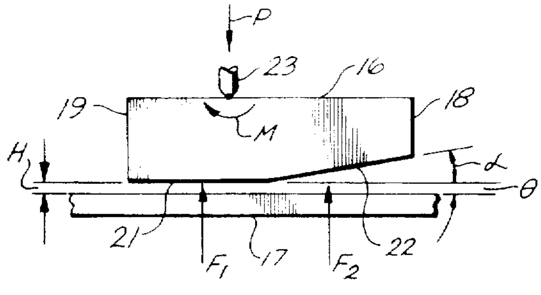
Figure 5:
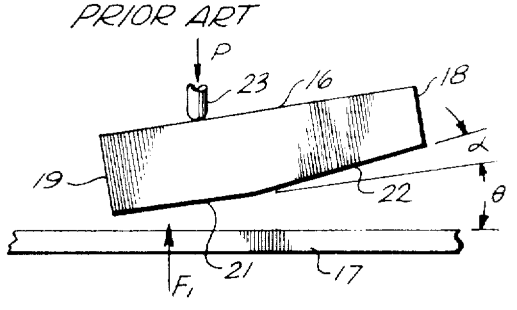

The satellite bearing face also contributes to stability of the fluid film bearing in its final floating position, such as, for example, in a situation as illustrated schematically in FIG. 5. As illustrated in this drawing, some transient factor has caused the recording head 26 to change in pitch so that the angle of attack $\theta$ is negative, that is, the toe 27 of the head is pitched downwardly slightly relative to the heel of the head. In a conventional taper land bearing such a floating attitude would almost invariably lead to a crash of the head against the disk. In the illustrated embodiment, the satellite surface 33 acts as a plane bearing diverging from the disk and the center of pressure force $F_3$ generated because of this divergence now has a direction tending to bring the heel down and the toe up relative to the disk surface, thereby restoring the recording head to its proper floating attitude. The force $F_3$ on the satellite bearing surface has a sufficient moment arm about the piston 42 that the head is righted without crashing. In a conventional taper land bearing, a suitably directed force may be generated in such a situation; however, the moment arm around the piston is not sufficient to restore the bearing to its proper floating attitude prior to a crash.

Figure 6:
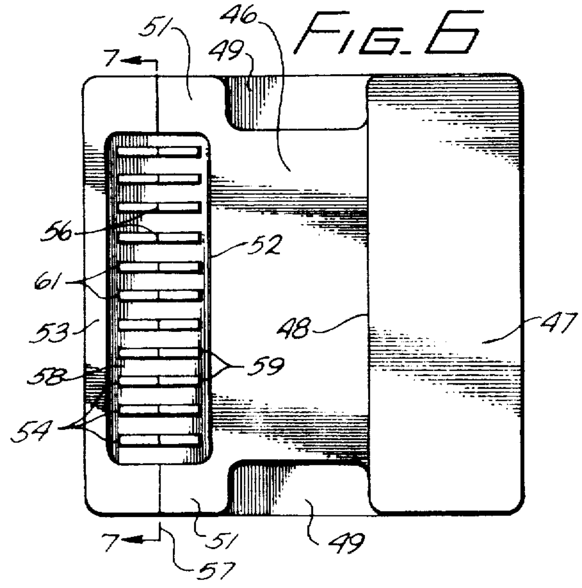
FIG. 6 illustrates the face of a second embodiment of the recording head incorporating principles of this invention.

FIG. 6 is a view of the face of another embodiment of magnetic recording head having a fluid film bearing incorporating principles of this invention. As illustrated in this embodiment, the fluid film bearing has a main bearing face 46 with a converging face 47 along its leading edge 48. The faces 46 and 47 are angulated at a very small angle so as to behave in the manner of a conventional taper land bearing. At each side of the main face 46 is a recessed portion 49 which serves to hydrodynamically separate the main face 46 and converging face 47 from a pair of satellite faces 51, which are at least partly aft of the trailing edge 52 of the main bearing face 46. The satellite faces 51 are coplanar with the main face 46.

Aft of the satellite faces 51 is a diverging face 53 angulated relative to the satellite faces 51 by a small angle in the same general manner as hereinabove described in relation to the recording head of FIGS. 1 and 2. A plurality of magnetic recording transducers 54 are mounted so that their magnetic gaps 56 are approximately aligned with the apex 57 between the satellite faces 51 and the diverging face 53. A region 58 (FIGS. 6 and 7) around the transducers 54 is recessed from the bearing surface of the recording head a sufficient distance that the recessed portion 58 does not generate a fluid film force. The transducers each have a portion 59 forward of the recording gap 56 that is coplanar with the main bearing face 46 and satellite faces 51. Each of the transducers also has a portion 61 aft of the recording gaps 56 coplanar with the diverging face 53. Thus, it will be seen that the transducers have their magnetic gaps 56 located approximately in line with the apex 57 between the satellite faces 51 and diverging face 53 in the same manner as the transducers 41 in FIG. 1 had their magnetic gaps along the apex 37 of the satellite face 33 and diverging face 38.

Figure 7:
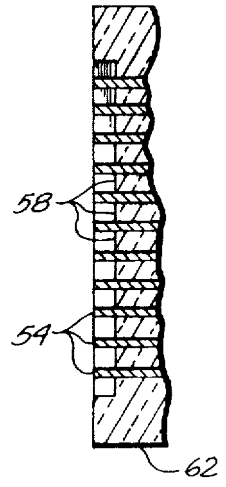
FIG. 7 is a partial cross section of the head of FIG. 6.

A difference in this embodiment as illustrated in FIGS. 6 and 7 is the recessed portion 58 around each of the transducers. The recessed portion 58 serves to provide a hydrodynamic separation between the main face 46 and a portion of the diverging face 53, and further provides a valuable clearance.

In fabricating a magnetic recording head, the main body 62 of the head is conventionally made of ceramic or glass type material in order to obtain good dimensional stability and provide for an excellent surface finish on the bearing faces. The recording transducers 54 are mounted in the ceramic body 62 by an epoxy resin (not shown), a small portion of which around the transducers may intersect the bearing faces in a conventional embodiment or in the embodiment of FIG. 1. It is found in practice that epoxy resin is not entirely dimensionally stable, and expansion of the epoxy resin as much as 50 microinches has been observed in extreme circumstances. Such an expansion of the epoxy resin can clearly interfere with the operation of a fluid film bearing wherein the recording head is as close as 30 microinches from the disk surface.

If a tiny scratch remains on or is inflicted on a ceramic bearing surface, the fragments of brittle material fall away and do not protrude from the surface. The epoxy resin, however, is subject to burrs or raised ridges along each side of the "trench" of a scratch and these burrs or ridges above the desired surface also interfere with bearing performance.

By providing a recessed area 58 around the recording heads 54, the epoxy resin employed for bonding the transducers to the ceramic body is sufficiently remote from the bearing surfaces that even the maximum expansion of the epoxy resin cannot interfere with the fluid film performance. Thus, in this embodiment the recessed area 58 serves the dual function of providing a hydrodynamic separation between various faces of the fluid film bearing, and also providing clearance for epoxy resin or the like employed for bonding the transducers to the body of the recording head.

The fluid film bearing provided in the embodiment in FIG. 6 performs in substantially the same manner as hereinabove described in the final floating position and also in the landing stages of the use of the head. An added benefit is obtained by providing the satellite faces 51 spaced laterally from the edges from the main bearing face 46, and also providing a converging face 47 that is wider transverse to the floating direction than the main bearing face 46. These laterally spaced portions of the bearing surface enhance roll stability and influence roll attitude. In operation, the recording head is gimbal mounted so that it can tilt in a roll direction, that is, about an axis along the flight directions in order to conform to the surface of the disk. In the illustrated embodiment, small forces generated on the satellite faces 51 and on the ends of the converging face 47 are remote from the center line of the bearing, and variations in roll attitude have a substantial effect on the fluid film forces generated by these faces. This combined with the long moment arm to the faces tends to influence roll attitude of the recording head, not only in its final floating position, but also during the landing stages of operation.

Figure 8:
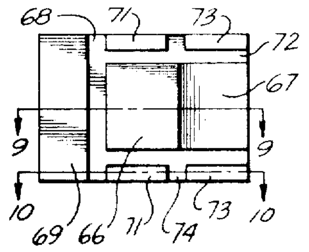
FIG. 8 is a view of the bearing face of another embodiment of fluid film bearing incorporating principles of this invention.
Figure 9:
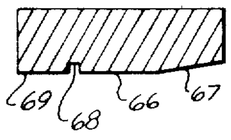
FIGS. 9 and 10 are longitudinal cross sections through the head of FIG. 8.
Figure 10:
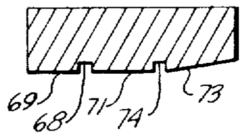

FIGS. 8, 9 and 10 illustrate in plan and two cross sections, respectively, another embodiment of magnetic recording head having a fluid film bearing incorporating principles of this invention. As illustrated in this embodiment, the fluid film bearing has a main face 66 preceded in the direction of flight by a converging face 67 angulated relative thereto by a small angle. A transverse slot 68 at the trailing edge of the main bearing face 66 provides a hydrodynamic separation between the main face 66 and a satellite face 69 coplanar with the main face 66. It will be apparent that a bearing such as illustrated in FIG. 8 performs in substantially the same manner as the fluid film bearings hereinabove described and illustrated in FIGS. 1 through 7.

In addition to the principal faces of the fluid film bearing, a pair of lateral faces 71 are provided at the sides of the main face 66 and separated therefrom by a longitudinally extending slot 72. The lateral faces 71 are coplanar with the main face 66. Forwardly of the lateral faces 71 are a pair of lateral converging faces 73 coplanar with the converging face 67 and separated from the lateral faces 71 by transverse slots 74. These lateral faces 71 and 73 enhance roll stability and influence roll attitude as hereinabove described. A somewhat larger force can be provided by the lateral faces by deleting the transverse slot 74 that hydrodynamically separates the lateral converging face 73 from the lateral face 71.

Figure 11:
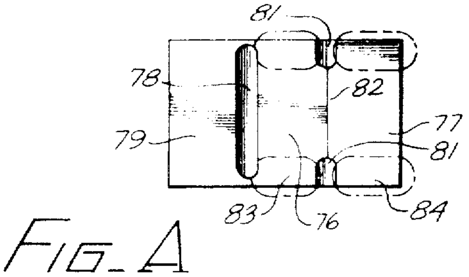
FIG. 11 illustrates another embodiment of fluid film bearing.

FIG. 11 illustrates in plan view another embodiment of magnetic recording head having a fluid film bearing incorporating principles of this invention. As illustrated in this embodiment, there is provided a main bearing face 76 preceded by a converging bearing face 77 angled relative thereto by a small angle. A transverse slot 78 hydrodynamically separates the trailing edge of the main face 76 from a coplanar satellite face 79.

A pair of short transverse slots 81 extending from the sides of the bearing along the apex line 82 between the main face 76 and converging face 77 provide a hydrodynamic separation between a side portion 83 at each side of the main face 76 and a side portion 84 at each side of the converging face 77. The fluid film pressure distribution in these circled side portions 83 and 84 is different from the fluid film pressure distribution on the main face 76 and converging face 77 because of the hydrodynamic separation provided by the transverse slots 81. It will be apparent that a fluid film bearing formed as illustrated in FIG. 11 will perform in a manner substantially similar to a bearing such as illustrated in FIG. 8.

Figure 12:
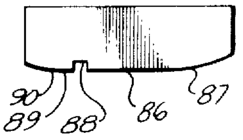
FIG. 12 illustrates another embodiment of fluid film bearing.

FIG. 12 illustrates still another embodiment of fluid film bearing incorporating principles of this invention. As illustrated in this embodiment, the magnetic recording head has a main face 86 arranged to float adjacent a recording disk (not shown), and instead of a converging planar face at the leading edge of the main face, there is provided a gradual curved bearing portion 87 which serves a somewhat similar function to the converging plane bearing faces hereinabove described in a taper land bearing. The main bearing face 86 terminates at its trailing edge in a transverse slot 88 which provides a hydrodynamic separation between the main face 86 and a satellite face 89. The satellite face 89 may also include a diverging curved bearing portion 90 so that the magnetic recording head has floating and landing properties similar to a recording head constructed with a fluid film bearing as hereinabove described in relation to FIGS. 1 and 2.

FIG. 13 illustrates still another embodiment of fluid film bearing incorporating principles of this invention. As illustrated in this embodiment, the magnetic recording head has a main face 92 which in its normal operating position is arranged to float adjacent a recording disk 93. At the leading edge of the main bearing face 92 is a converging planar face 94, which during normal operation cooperates with the main bearing face 92 as a conventional taper land bearing. Aft of the trailing edge of the main bearing face 92 is a diverging plane bearing face 95 angulated relative to the main bearing face by a very small angle. As in the other views in this application, the angles are exaggerated for purposes of illustration.

During the course of landing the magnetic recording head illustrated in FIG. 13, the diverging face 95 first approaches the disk 93 since the toe of the head is pitched up. Typically, the diverging face 95 is approximately parallel to the disk during landing. In such a position, the main bearing face 92 and diverging face 95 cooperate with the disk in the manner of a conventional taper land bearing. In such a bearing, the force $F_1$ on the main bearing face is relatively small and the force $F_2$ on the diverging satellite face is relatively large. During the initial stages of landing, the forces on the main converging face 94 are negligible. Since the force $F_2$ is substantially larger than the force $F_1$ and is aft of the point of application of the piston force P, there is a moment tending to urge the head to its final operating position.

The diverging satellite face 95 in cooperation with the main bearing face 92 is not quite as good as the fluid film bearing arrangement illustrated in FIGS. 1 to 7, and these embodiments are particularly preferred. The manufacture of a head in accordance with FIG. 13 is also somewhat more expensive since it is necessary that the apex 96 between the main bearing face 92 and diverging satellite bearing face 95 be positioned with appreciable accuracy so that the operating characteristics of the bearing can be predicted for both the landing phase and the normal operating phase of operation. In an embodiment as hereinabove provided wherein there is a full hydrodynamic separation between the main bearing face and the satellite bearing face the location of the apex is not nearly so critical and, hence, manufacturing costs are less.

Several embodiments of magnetic recording head for a magnetic memory system having a fluid film bearing incorporating principles of this invention have been described. Many modifications and variations of the present invention will be apparent to one skilled in the art in order to adapt the fluid film bearing to other recording heads or to other structures involving relatively movable parts. It is, therefore, to be understood that within the scope of the appended claims the invention may be practiced otherwise than as specifically described.

What is claimed is:

1. A fluid film bearing member movable between a first position sufficiently remote from a second member movable relative thereto that fluid film forces are negligible and a second position sufficiently near the second member that fluid film forces between the two members are substantial comprising:

a main bearing portion having a leading edge and a trailing edge on the bearing member and adapted to float adjacent the second member in the second position for generating a principal portion of fluid film force while in the second position; and means for generating a larger fluid film force than the main bearing portion at an intermediate position during transition of the bearing member between the first position and the second position comprising a satellite bearing portion at least partly hydrodynamically separated from and aft of the trailing edge of the main bearing portion and adapted to float adjacent the second bearing member in the second position for generating a minor portion of fluid film force while in the second position.

2. A fluid film bearing member as defined in claim 1 wherein the main bearing portion comprises:

a main bearing face having a leading edge and a trailing edge; and a converging bearing face having a trailing edge coincident with the leading edge of the main bearing face, the converging face being angulated relative to the main face.

3. A fluid film bearing member as defined in claim 2 wherein the satellite bearing portion comprises a satellite bearing face having a leading edge and a trailing edge and coplanar with the main bearing face of the main bearing portion; and a diverging bearing face having a leading edge at least in part coincident with the trailing edge of the satellite bearing face and angulated relative to the satellite face.

4. A fluid film bearing member as defined in claim 3 wherein the diverging bearing face is at a greater angle from the satellite bearing face than the converging bearing face is from the main bearing face.

5. A fluid film bearing member as defined in claim 1 wherein the satellite bearing portion includes a bearing face having a leading edge displaced laterally from the main bearing face in a direction transverse to the direction of relative motion of the baring member and second member for enhancing roll stability and influencing roll attitude of the bearing member.

6. A magnetic memory system comprising:

a recording head having a leading edge and a trailing edge;

a magnetic memory surface movable relative to the recording head;

the recording head being movable between a retracted position relatively remote from the memory surface and a final floating position at a relatively small predetermined distance from the memory surface, a main bearing surface on the recording head arranged to float adjacent the memory surface when the head is in the final floating position and for generating a principal portion of fluid film force while the recording head is in the final floating position; and means for applying a substantial moment to the recording head in a position intermediate between the retracted and floating positions, the moment tending to raise the trailing edge and lower the leading edge of the recording head relative to the memory surface, comprising a satellite bearing portion having at least a portion aft of the main bearing surface and hydrodynamically separated therefrom.

7. A magnetic memory system as defined in claim 6 wherein the satellite bearing comprises:

a satellite plane bearing face having a leading edge and a trailing edge and a satellite diverging bearing face having a leading edge at least partly coincident with the trailing edge of the satellite bearing face, the satellite diverging bearing face being angulated relative to the satellite plane bearing face for diverging from the magnetic memory surface while the recording head is in the final floating position.

8. A magnetic memory system as defined in claim 7 further comprising:

a plurality of magnetic recording transducers, each of the transducers having a recording gap substantially aligned with the trailing edge of the satellite bearing face.

9. A magnetic memory system as defined in claim 6 wherein the satellite bearing portion is substantially longer in a direction transverse to the direction of movement relative to the memory surface than it is in a direction parallel to the direction of relative movement.

10. A magnetic memory system as defined in claim 6 wherein the main bearing surface comprises a taper land bearing having a plane main bearing face having a leading edge and a trailing edge; and a plane converging bearing face having a trailing edge coincident with the leading edge of the main bearing face, the converging bearing face being angulated relative to the main bearing face.

11. A magnetic memory system as defined in claim 10 wherein the satellite bearing portion comprises a satellite plane bearing face having a leading edge and a trailing edge, the leading edge being hydrodynamically separated from the trailing edge of the main bearing face; and a satellite diverging bearing face having a leading edge at least in part coincident with the trailing edge of the satellite bearing face, the diverging face being angulated relative to the satellite face.

12. A magnetic memory system as defined in claim 11 further comprising:

a plurality of magnetic transducers, each of the transducers having a magnetic recording gap approximately aligned with the trailing edge of the satellite bearing face.

13. A magnetic memory system as defined in Claim 12 further comprising:

a recessed region surrounding each of the transducers sufficiently remote from the bearing faces to be substantially free of fluid film forces.

14. A magnetic memory system as defined in claim 6 further comprising resilient means for applying a moment to the recording head, the applied moment being negligible while the recording head is in the retracted position and substantial when the recording head is in the final floating position and wherein the moment applied to the recording head by the satellite bearing position when the recording head is in a position intermediate between the retracted and floating positions is at least as great as the moment applied by the resilient means.

15. A recording head comprising:

a fluid film bearing surface portion adapted to float adjacent the magnetic memory surface on a fluid film and having: a first bearing face having a trailing edge; and a second bearing face having at least a portion of leading edge coincident with the trailing edge of the first bearing face, the second bearing face being angulated relative to the first bearing face;

a recessed region within the fluid film bearing surface; and a magnetic transducer mounted in the recording head within the recessed region and having a magnetic recording gap substantially aligned with the trailing edge of the first bearing face, and substantially flush with the fluid film bearing surface.

16. A recording head as defined in claim 15 wherein the bearing surface further comprises:

a third bearing face coplanar with the first bearing face and having a trailing edge hydrodynamically separated from the leading edge of the first bearing face.

17. A recording head as defined in claim 16 wherein the bearing surface further comprises:

a fourth bearing face having a trailing edge coincident with the leading edge of the third bearing face and angulated relative thereto by a small angle.

* * * * *